(12) United States Patent
Abedin et al.

(10) Patent No.: US 9,946,014 B2
(45) Date of Patent: Apr. 17, 2018

(54) TECHNIQUES AND DEVICES FOR LOW-LOSS COUPLING TO A MULTICORE FIBER

(75) Inventors: Kazi S. Abedin, Basking Ridge, NJ (US); Thierry F. Taunay, Bridgewater, NJ (US); Man F. Yan, Berkeley Heights, NJ (US); Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 31 days.

(21) Appl. No.: 14/126,564

(22) PCT Filed: Jun. 20, 2012

(86) PCT No.: PCT/US2012/043410
§ 371 (c)(1),
(2), (4) Date: Jan. 10, 2014

(87) PCT Pub. No.: WO2012/177808
PCT Pub. Date: Dec. 27, 2012

(65) Prior Publication Data
US 2014/0119694 A1   May 1, 2014

Related U.S. Application Data

(63) Continuation-in-part of application No. 13/049,597, filed on Mar. 16, 2011, now abandoned.
(Continued)

(51) Int. Cl.
*G02B 6/02*   (2006.01)
*G02B 6/255*   (2006.01)
(Continued)

(52) U.S. Cl.
CPC ....... *G02B 6/02042* (2013.01); *G02B 6/2552* (2013.01); *G02B 6/262* (2013.01);
(Continued)

(58) Field of Classification Search
None
See application file for complete search history.

(56) References Cited

U.S. PATENT DOCUMENTS 8,320,724 B2 * 11/2012 Sasaoka ............. G02B 6/02042
385/121
8,417,077 B2 * 4/2013 Sasaoka ............. G02B 6/02042
385/114
(Continued)

FOREIGN PATENT DOCUMENTS

JP   S55175802 A   12/1980
JP   H10125988    5/1998

*Primary Examiner* — Chad H Smith
(74) *Attorney, Agent, or Firm* — Jacobs + Kim LLP

(57) ABSTRACT

An optical pedestal fiber is configured to be taperable to form a tapered fiber having a mode field diameter at the tapered end that differs from the mode field diameter at the untapered end in correspondence with the difference between the cladding diameter at the tapered end and the cladding diameter at the untapered end. A plurality of such pedestal fibers can be used to construct a tapered fiber bundle coupler that provides matching of both core pitch and mode field diameter between a plurality of input fibers and individual cores of a multicore fiber. Further, the tapered fiber bundle coupler can be constructed using a plurality of fibers, in which individual fibers are configured to have different effective refractive indices, thereby suppressing crosstalk therebetween.

13 Claims, 11 Drawing Sheets

Related U.S. Application Data

(60) Provisional application No. 61/498,988, filed on Jun. 20, 2011, provisional application No. 61/314,182, filed on Mar. 16, 2010.

(51) Int. Cl.
  *G02B 6/26* (2006.01)
  *H01S 3/067* (2006.01)
  *H01S 3/094* (2006.01)
  *H01S 3/0941* (2006.01)
  *H01S 3/16* (2006.01)
  *G02B 6/036* (2006.01)

(52) U.S. Cl.
  CPC ...... *G02B 6/03633* (2013.01); *H01S 3/06737* (2013.01); *H01S 3/06754* (2013.01); *H01S 3/09415* (2013.01); *H01S 3/094003* (2013.01); *H01S 3/1608* (2013.01)

(56) References Cited

U.S. PATENT DOCUMENTS

| | | | |
|---|---|---|---|
| 8,503,847 B2 | 8/2013 | Kokubun | |
| 2008/0209952 A1* | 9/2008 | Tremblay | G02B 6/2835 65/402 |
| 2009/0154881 A1* | 6/2009 | Salokatve | G02B 6/2835 385/46 |
| 2010/0008624 A1* | 1/2010 | Singer | G02B 6/30 385/24 |
| 2010/0278486 A1* | 11/2010 | Holland | G02B 6/262 385/43 |
| 2011/0002585 A1* | 1/2011 | Gibson | G02B 6/2856 385/43 |

* cited by examiner

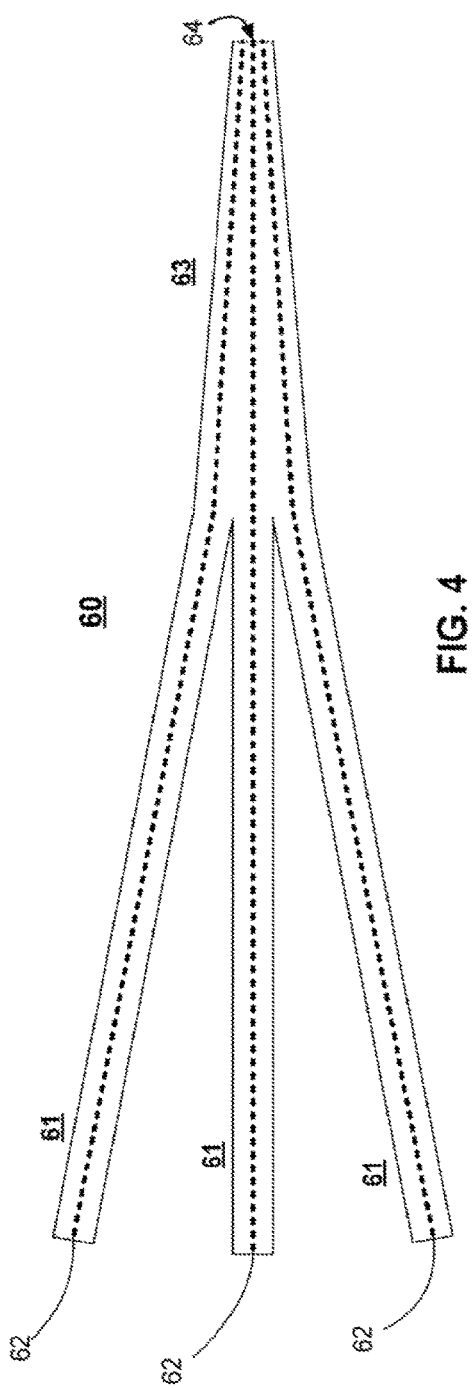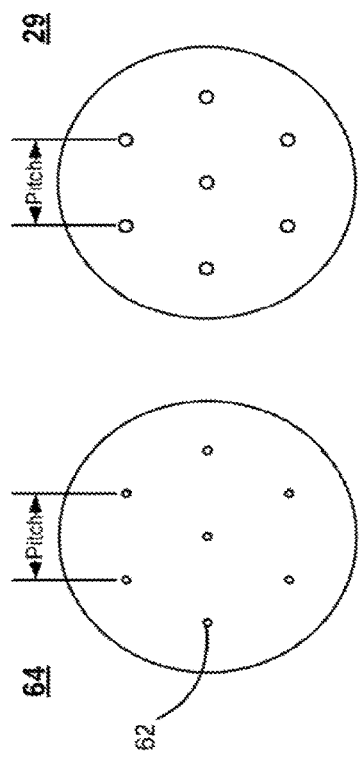
FIG. 4
FIG. 5

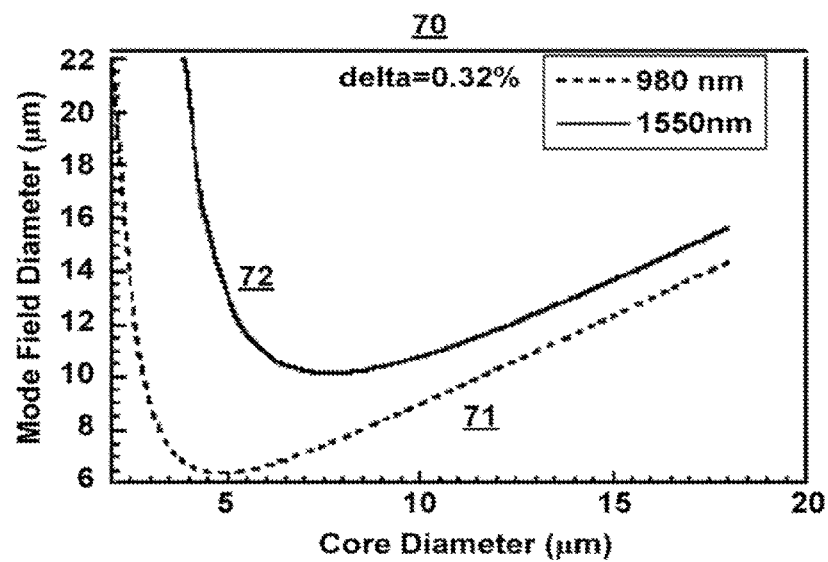
FIG. 7
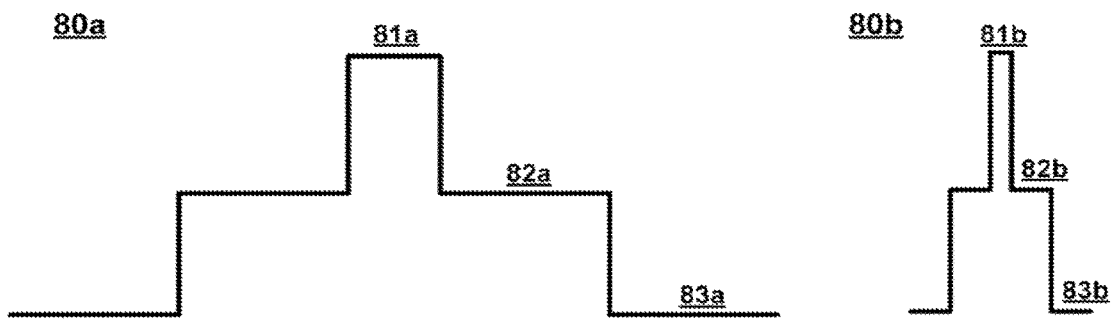
FIG. 8A
FIG. 8B

TECHNIQUES AND DEVICES FOR LOW-LOSS COUPLING TO A MULTICORE FIBER

CROSS REFERENCE TO RELATED APPLICATIONS

The present application claims the priority benefit of U.S. Provisional Patent Application No. 61/498,988, filed on Jun. 20, 2011, which is owned by the assignee of the present application, and which is incorporated herein by reference in its entirety.

The present application is a continuation-in-part of U.S. patent application Ser. No. 13/049,597, filed on Mar. 16, 2011, which is owned by the assignee of the present application, and which is incorporated by reference herein in its entirety.

U.S. patent application Ser. No. 13/049,597, filed on Mar. 16, 2011, claims the priority benefit of U.S. Provisional Patent Application Ser. No. 61/314,182, filed on Mar. 16, 2010, which is owned by the assignee of the present application, and which is incorporated herein by reference in its entirety.

BACKGROUND OF THE INVENTION

Field of the Invention

The present invention relates generally to the field of fiber optics and in particular to techniques and devices for coupling to the individual cores of a multicore fiber and further, for maintaining low optical loss when coupling to the individual cores of a multicore fiber.

Background Art

Because of the ever-expanding need for large-capacity optical networks, there is increasing interest in the design and fabrication of systems employing multicore fibers (MCFs) as a means for expanding network capacity. The full exploitation of the potential of MCFs has required the development of fibers having a large number of closely-spaced cores, e.g. 7 or more, as well as corresponding fiber-based amplifiers, and other fiber based components, comprising a plurality of cores for amplifying signals carried by respective individual cores in a multicore fiber (MCF) transmission system.

To achieve amplification using a multicore fiber amplifier, it is necessary to separately launch signals from a plurality of input fibers into respective individual amplifier cores. In addition, it is desirable to be able to pump each core separately, in order to maintain a constant or predetermined gain under various conditions of an input signal, independent of input power fluctuations and other parameters.

One technical issue that must be addressed arises from the fundamentally different geometries of typical input fibers and multicore amplifier fibers. For example, it may be desired to provide coupling between 7 standard single-core, single-mode fiber (SSMF) inputs and respective individual cores of a 7-core amplifier multicore fiber (A-MCF), wherein the 7 SSMFs and the A-MCF each have substantially the same outer diameter, e.g. ~125 μm. A coupler must provide a transition between the cross-sectional area of seven SSMFs and the cross-sectional area of a single SSMF, in a way that allows each SSMF core to be connected to a respective individual A-MCF core.

In addition, a successful coupling solution must also address the issue of mode field diameter. The mode field diameter at each input into the coupler should match the mode field diameter of each respective input SSMF, and the mode field diameter of each core at the coupler output should match the mode field diameter of each respective A-MCF core. A significant mismatch in mode field diameter will result in unacceptably high loss. Thus, a coupling approach in which segments of SSMF are tapered in order to achieve a desired output geometry is unsatisfactory because of the increase in mode field diameter that typically results from tapering.

SUMMARY OF THE INVENTION

Aspects of the invention provide novel structures and techniques for low-loss coupling of optical fibers having dissimilar geometries and mode field diameters. According to further aspects of the invention, these novel structures and techniques are applied in the context of providing low-loss coupling between a plurality of input fibers and respective individual cores of a multicore fiber.

In one technique according to an aspect of the invention, low-loss coupling of first and second dissimilar fibers is achieved by tapering a pedestal fiber having a refractive index profile that is configured such that the tapering of the fiber to a predetermined tapering ratio results in a structure having a first end with a geometry and a mode field diameter that are configured for low-loss connection to the first fiber, and a second end having a geometry and a mode field diameter that are configured for low-loss connection to the second fiber.

In a further practice of the invention, the above fiber is configured such that the tapering of the fiber to a selected tapering ratio causes a selected reduction in the mode field diameter. The fiber can be used, for example, to provide coupling between a standard single-core input fiber and a rare-earth-doped gain fiber.

In a further practice of the invention, a plurality of the above-described pedestal fibers are fused together to form a tapered fiber bundle (TFB) that provides a low-loss transition between a plurality of TFB inputs and a multicore TFB output. The TFB inputs each have respective geometries and mode field diameters configured for low-loss connection to a respective plurality of input fibers; the multicore TFB output comprises a plurality of cores having a geometry and respective mode field diameters that are configured for low-loss connection to respective cores of a multicore fiber.

A further aspect of the invention is directed to the reduction of crosstalk in the above-described TFB.

BRIEF DESCRIPTION OF THE DRAWINGS

FIG. 4 shows a diagram of an exemplary tapered fiber bundle coupler.

FIG. 5 shows a pair of endface views illustrating the respective core geometries of the output end of the tapered fiber bundle coupler shown in FIG. 4 and the multicore fiber shown in FIGS. 1A and 1B.

FIG. 7 shows a graph illustrating the calculated mode field diameter, at wavelengths of 980 nm and 1550 nm, as a function of core diameter in a standard single-mode fiber, according to the prior art.

FIGS. 8A and 8B show respective refractive index profiles for an exemplary pedestal fiber before and after tapering, in accordance with an embodiment of the present invention.

DETAILED DESCRIPTION

Figure 1A:
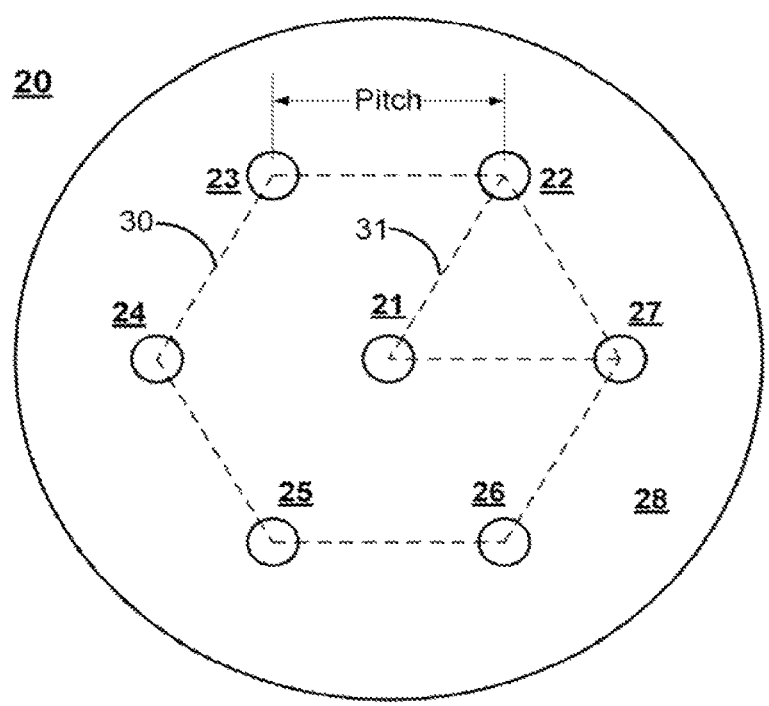
FIGS. 1A and 1B show, respectively, endface and perspective views of an exemplary seven-core multicore fiber.

Aspects of the invention are directed to structures and techniques for providing low-loss coupling of optical fibers having dissimilar geometries and mode field diameters. According to further aspects of the invention, these novel structures and techniques are applied in the context of providing low-loss coupling between a plurality of input fibers and respective individual cores of a multicore fiber.

In particular, as discussed below, aspects of the invention are applied in the context of a tapered fiber bundle (TFB) coupler that can be used for providing a low-loss, low-crosstalk interface between a plurality of input fibers (for example, pigtail fibers used on a common port of a pump/signal combiner) and a multicore gain fiber, or other fiber, with a mode field diameter (MFD) different from that of the input fibers.

It is noted that the described inventive TFB is fundamentally different from the structures described in U.S. Pat. No. 5,864,644 ("the '644 TFB"). In the TFB described in the present application, individual cores at both ends of the bundle remain physically distinct from each other. Each of these individual cores is designed to have a prescribed mode field diameter at the untapered end and a different prescribed mode diameter in the tapered end at a given taper ratio. In addition, according to a further aspect of the invention, the TFB cores are further configured to reduce crosstalk therebetween.

In the '644 TFB, individual cores at the TFB input merge into one single core, such that light launched into the individual cores at the untapered end will be combined together at the tapered end. Thus, in the '644 TFB, high crosstalk among cores is desirable.

Other aspects of the invention include the following:

(a) A pedestal fiber is described having a refractive index profile that is configured to achieve a desired MFD for a selected tapering ratio. More specifically, the untapered end of a segment of the pedestal fiber has an MFD that is matched with the MFD of a pigtail fiber, which may be single-mode. The tapered end of the pedestal fiber segment has an MFD that is matched with that of a single-core (or multicore) fiber with a core (or cores) having a different MFD, such as a small-core gain fiber.

(b) TFB couplers are described that are fabricated using pedestal fibers of the type described in paragraph (a) for efficient coupling of light from a plurality of input fibers to a respective plurality of individual cores of a multicore gain fiber, or other multicore fiber having a different MFD.

(c) Pedestal fibers of the type described in paragraph (a) are configured to suppress crosstalk at each position along a taper within a TFB coupler or like device.

(d) A set of bundled pedestal fibers is described in which the individual fibers are configured to have different respective propagation constants for the lowest-order mode, and to have approximately the same untapered MFD. The fibers are further configured, such that when the bundled fibers are all tapered to a predefined tapering ratio, they all have approximately the same tapered MFD. This feature is achieved by properly adjusting the indices and radii of the core and pedestal region of each pedestal fiber. In an alternative practice of the invention, the individual fibers are configured to have the same tapered MFD, but different untapered MFDs. Further, the individual fibers can be configured such that their respective MFDs can be configured to differ from each other by approximately 1-2 μm.

(e) A TFB coupler is described comprising a bundle of at least three dissimilar fibers of the type described in paragraph (d), wherein the fibers are arranged so as to suppress crosstalk.

The following description is organized into the following sections:

1. Exemplary 7-Core Configuration
2. Exemplary TFB Coupler
   2.1 Mode Field Diameter
   2.2 Mode Coupling (Crosstalk)
3. Specially Designed Pedestal Fiber for Use in TFB Coupler
4. Other Applications
5. General Techniques
6. Example of Experimental Use of TFB Coupler Conclusion 1. Exemplary 7-Core Configuration Aspects of the invention are described in the context of providing an interface between an exemplary 7-core MCF and a set of 7 single-core, single-mode pigtail input fibers. It will be appreciated that the structures and techniques described herein may be modified for use with other types of MCFs and input fibers having different geometries and core configurations than those specifically depicted and described herein.

For example, the described structures and techniques may be used in conjunction with fibers comprising single-mode cores, multimode cores, or some combination thereof, as well as fibers having other profiles, other cross-sectional core configurations, or a number of cores different from those described herein. In addition, in the following description and accompanying drawings, there is a one-to-one correspondence between the input fibers and the MCF cores. It will be appreciated that, in certain practices of the invention, it may not be necessary or desirable to have such a one-to-one correspondence.

Figure 1B:
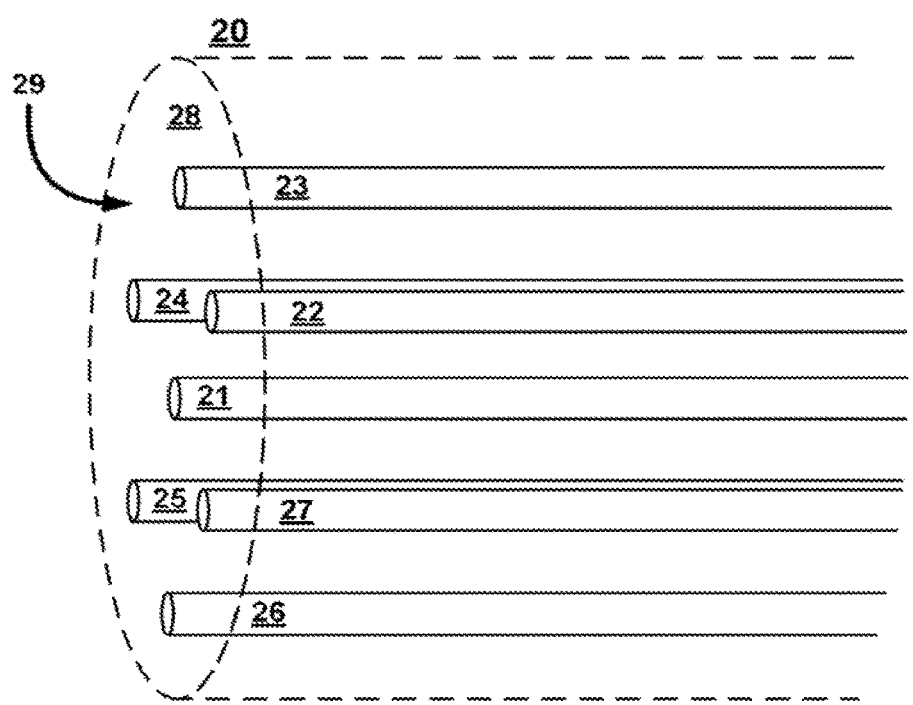

FIG. 1A shows a cross section view of an exemplary MCF 20 to be connected to a plurality of input fibers. MCF 20 comprises seven raised or step-index single-mode cores 21-27 that extend through a common cladding 28, as shown in FIG. 1B. Generally speaking, it is desirable for an MCF design to have an outer diameter that is equal to that of typical single-core fibers in order to allow the MCF and input fibers to occupy the same amount of physical space as a single-core fiber. For example, MCF 20 has a circular outer profile with an outer diameter of 125 µm, which is a standard diameter for common single-core fibers.

The MCF cores 21-27 have a cross-sectional hexagonal configuration at endface 29 with a center core 21 and six outer cores 22-27 positioned at the vertices of a regular hexagon 30. It will be seen that each pair of adjacent outer cores 22/23, 23/24, 24/25, 25/26, 26/27, 27/22 and center core 21 forms an equilateral triangle 31. It will thus be seen that the core-to-core spacing between each core and the immediately adjacent cores, i.e. the core "pitch," is the same for all seven cores. In the present example, the core pitch is approximately 40 µm, which is approximately one-third of the diameter of a common 125 µm single-mode pigtail fiber.

Figure 2:
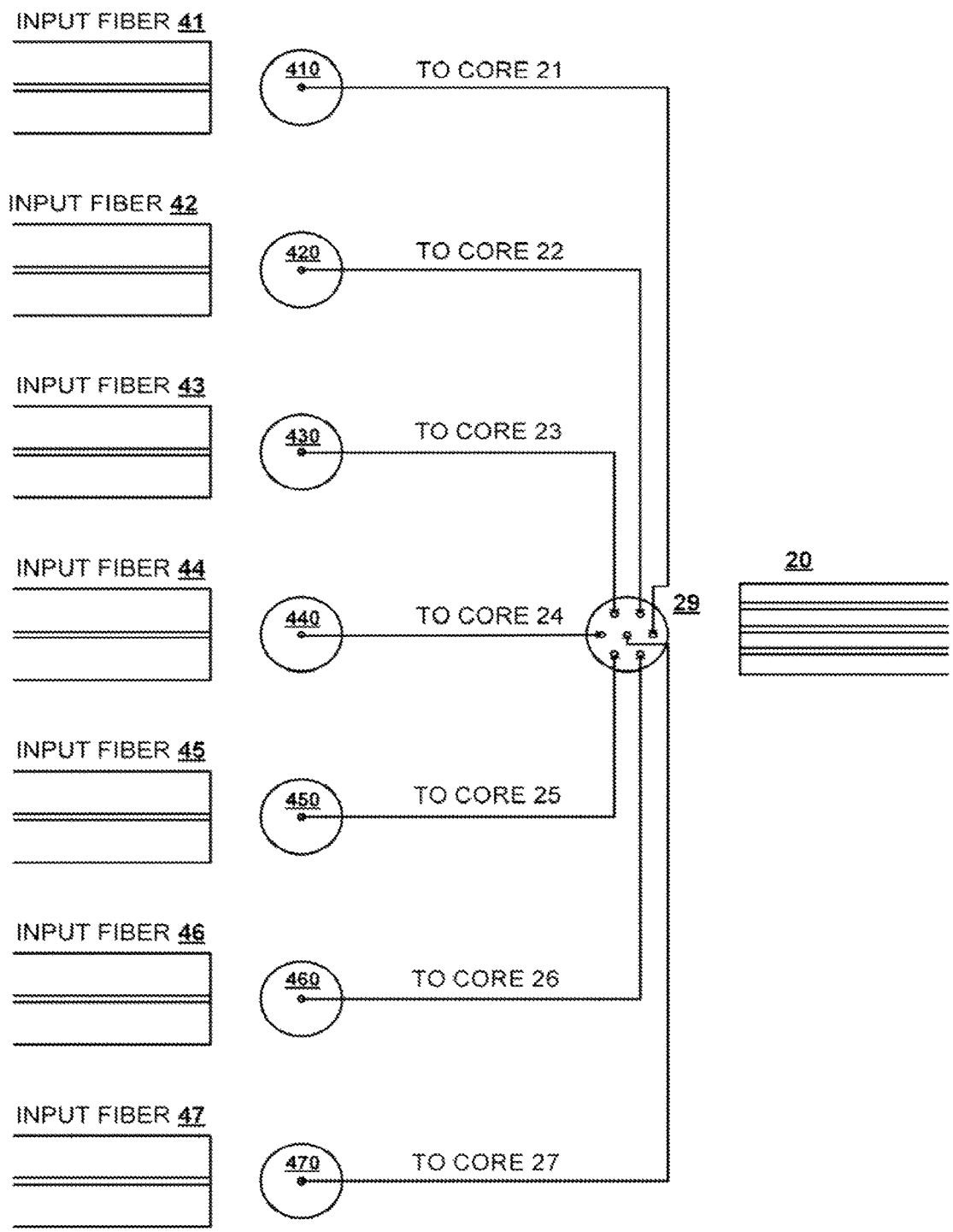
FIG. 2 shows a diagram of an optical link comprising seven input fibers and the multicore fiber shown in FIGS. 1A and 1B.

FIG. 2 shows a diagram of an optical link comprising seven input fibers 41-47 and a length of MCF 20, as shown in FIGS. 1A and 1B. Each input fiber 41-47 has a single, centrally located, single-mode core 410-470, and a circular outer profile with a diameter nominally equal to that of MCF 20, i.e., 125 µm. Each of the input fiber cores 41-47 is to be connected to a respective individual MCF core 21-27 at MCF endface 29.

It will be appreciated from the present description that it is possible to practice aspects of the invention in optical links having configurations and topologies different from that of the FIG. 2 optical link, including asymmetrical configurations, non-hexagonal core patterns, configurations employing more than one MCF, and configurations employing MCFs with a different number or arrangement of cores. In addition, it is also possible to practice aspects of the invention in optical links including input fibers having an outer diameter different from that of the MCF.

Figure 3:
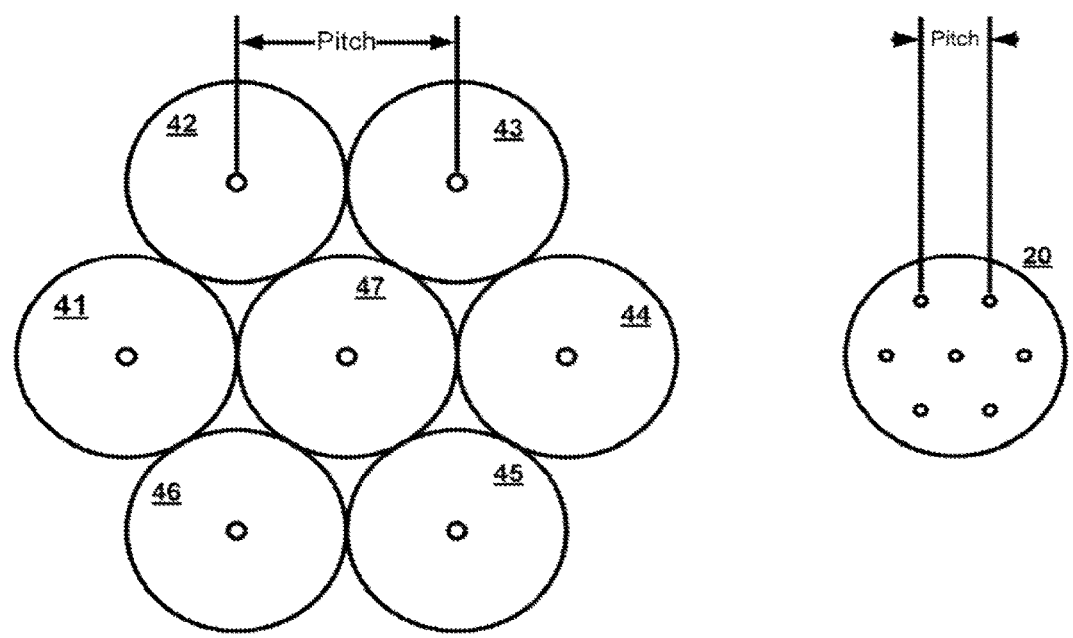
FIG. 3 shows a pair of endface views illustrating the respective core geometries of the input fibers shown in FIG. 2 and the multicore fiber of FIGS. 1A and 1B.

FIG. 3 provides a side-by-side comparison of respective cross sections of input fibers 41-47 and MCF 20. Input fibers 41-47 have been assembled into a closely packed stack having a core pitch of 125 µm, which is significantly larger than the 40 µm pitch of MCF 20. Thus, coupling the seven single-core fibers to the individual cores of MCF 20 requires a structure, such as a fanout, for providing an interface between the closely spaced cores of MCF 20 and the more widely spaced cores of the input fibers 41-47.

According to an aspect of the invention, a tapered fiber bundle (TFB) coupler is used to achieve the required fanout. TFB couplers have been used previously in other contexts, such as providing inputs to both the core and cladding of a cladding-pumped device. However, the use of TFB couplers has not heretofore been successfully extended to multicore fibers and devices because of a number of issues addressed by aspects of the present invention.

Following a brief description of an exemplary technique for constructing a TFB coupler, there follows a description of techniques and fibers that address the issues of mode field diameter and crosstalk.

2. Exemplary TFB Coupler

According to an aspect of the invention, a tapered fiber bundle (TFB) coupler is used to provide a tapered interface between a plurality of input fibers and individual cores at an endface of a multicore fiber. TFB couplers have been employed in other contexts, as described in U.S. Patent Pub. No. 2008-0267560, incorporated by reference in its entirety. As discussed below, for a number of reasons. TFB couplers have not heretofore been successfully employed in conjunction with multicore fibers and devices.

FIG. 4 shows a diagram (not drawn to scale) of an exemplary TFB coupler 60, comprising a plurality of pigtail input fibers 61 with respective individual cores 62 that are bundled together in a fused tapered block 63 that terminates in an output endface 64. FIG. 5 shows a cross section diagram (not drawn to scale) that provides a side-by-side comparison between TFB coupler endface 64 and MCF endface 29, illustrating the one-to-one correspondence between the individual cores 62 at the TFB endface 64 and the MCF endface 29.

As shown in FIG. 5, cores 62 at TFB endface 64 may not match in physical size with the cores of MCF endface 29. When tapering TFB coupler 60, the output cores 62 may be small relative to the cores at the MCF endface 29. However, as discussed below, the decrease in TFB core size caused by tapering is accompanied by an increase in mode field diameter (MFD). As further described below, the TFB output cores 62 are configured to have an MFD similar to that of the MCF cores.

TFB coupler 60 is configured such that the pigtail input fibers 61 have endface geometries matching those of input fibers 41-47, and such that the TFB output endface 64 has a core configuration matching that of MCF endface 29. It is noted that the other perimeter of the TFB output endface 64 and the outer perimeter of the MCF endface 29 may have different shapes, so long as it is possible to connected the two endfaces together with their respective cores in proper alignment with each other. The tapered block 63 provides a tapered transition between the TFB input and output geometries.

FIGS. 6A-6D are a series of diagrams illustrating an exemplary technique for fabricating a TFB coupler.

Figure 6A:
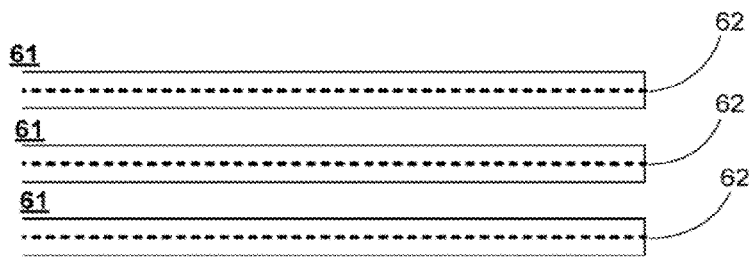
FIGS. 6A-6D are a series of diagrams illustrating an exemplary technique for fabricating a tapered fiber bundle coupler.

FIG. 6A: First, a set of suitable fibers 61 is assembled. In the present example, these fibers are standard pigtail single-mode fibers. However, it will be appreciated that the described techniques may also be employed with other types of fibers.

Figure 6B:
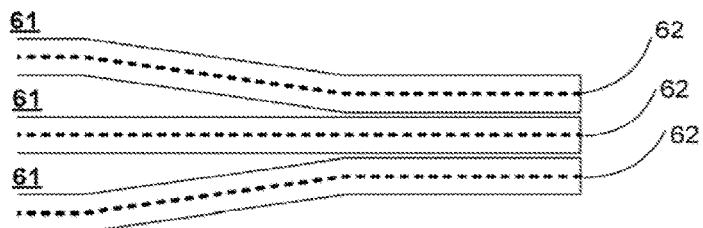

FIG. 6B: The ends of the fibers 61 are gathered together, and their respective cores 62 are precisely positioned with respect to each other, in accordance with the desired final arrangement of the cores.

Figure 6C:
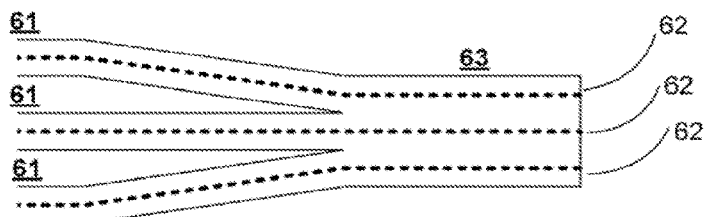

FIG. 6C: The ends of the fibers are then heated and fused together to form a block 63. This can be also done by suitable adhesive material.

Figure 6D:
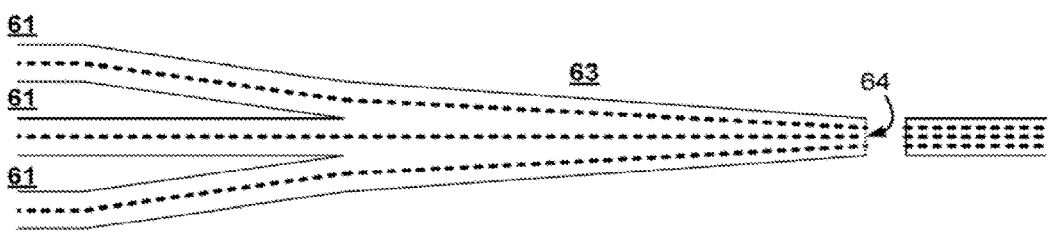

FIG. 6D: The block 63 is then tapered to a desired tapering ratio and then trimmed to produce the TFB coupler endface 64.

Although the use of a TFB coupler structure addresses the issue of core pitch, a number of other issues must be addressed, including mode field diameter and crosstalk.

2.1 Mode Field Diameter

One issue is that a multicore gain fiber typically has a relatively small mode field diameter (MFD) in comparison with the MFD of a pigtail fiber. Conventional tapered bundled fiber (TFB) couplers are often designed to have a mode field diameter at both the tapered end and the untapered end that corresponds to that of a standard pigtail fiber (typically 8-9 µm). The mode field diameter of the cores of the gain fiber (typically 5-6 µm, with a core size of approximately 3 µm) is often considerably smaller than that of a pigtail fiber, which can result in large splicing loss.

It should be noted that, as used herein, when the MFD of a first fiber is said to "correspond" to the MFD of a second fiber, the word "correspond" is used to mean that the two MFDs are close enough to each other to allow the fibers to be connected to each other with acceptably low loss. Thus, "correspond" is not synonymous with "equal." For example, a small amount of thermal diffusion can be used to improve mode field matching.

Conventional methods of splicing grossly dissimilar cores often are not suitable in the case of multicore fiber. As mentioned above, pigtail fibers typically have a MFD of 8-9 µm, whereas a gain fiber, such as an erbium-doped fiber (EDF), typically has a MFD of 5-6 µm. This difference is too large. For example, splicing using thermal diffusion is problematic as prolonged heating can distort the symmetry of the core arrangements as well as the shape of the cores. Further, thermal diffusion can affect the mode field diameter of the central core differently from that in the outer cores. Thus, while some amount of thermal diffusion may be desirable to refine the mode field matching between corresponding cores, it is undesirable when the mode field diameters are so grossly dissimilar.

Generally speaking, MFDs within approximately 1 µm of each other are amenable to fine-tuning using thermal diffusion. Thus, with respect to the exemplary couplers described herein, it will be understood that while an exact matching of MFDs is desirable, it is possible to achieve an acceptably low level of loss where the MFDs match each other within a range of approximately ±1 µm.

2.2 Mode Coupling (Crosstalk)

Generally speaking, crosstalk decreases with an increase in fiber length, as a result of random mode coupling. In the tapered region of a coupler, where the core diameters are being changed continuously or near continuously over a short length of fiber (i.e., a length of fiber in which random mode coupling has a relatively insignificant impact on crosstalk), crosstalk between the cores may result at any point along the taper due to well-known resonant and evanescent coupling mechanisms. This is particularly the case when the fibers in the TFB are nearly identical, and thus, have nearly identical propagation constants. β. Additionally, for some core designs, such as step-index fibers having a V-number less than about 1.8, tapering will expand the mode field, possibly causing significant overlap between cores. Thus, even if the mode overlap at the input and output ends of the tapered fibers is sufficiently small so as to locally inhibit crosstalk, crosstalk may occur between the input and output ends as a result of an increased mode overlap.

3. Specially Designed Pedestal Fiber for Use in TFB Coupler

According to an aspect of the invention, the above issues are addressed through the use of specially designed fibers for use in constructing a TFB coupler. In order to understand the rationale behind these designs, there are first described the requirements for exemplary multicore fibers, and multicore fiber devices.

For effective spatial division multiplexing in an exemplary multicore fiber, a plurality of cores, e.g., 7 or 19, are arranged, preferably, in a hexagonal pattern and embedded in a cladding with diameter similar to that of a standard single mode fiber, e.g. 125 µm. As discussed above, an exemplary 7-core MCF has a core-to-core pitch of approximately 40 µm.

For MCF-based applications in optical amplification in the 1.55 µm band, each MCF core typically is doped with one or more rare earth elements, such as erbium or a mixture of erbium and ytterbium. In other applications, such as Raman or parametric amplification, non-rare-earth dopants may be used. For these as well as other types of fiber amplifiers, it is desirable for each MCF core to have a small diameter, e.g., 3 µm, to achieve good amplification with low pump power. For devices using nonlinear effects, the core diameter can be considerably smaller. Alternately, for devices designed to operate at high output power, the core diameter can be considerably larger to avoid deleterious nonlinear effects and power-depleting effects such as excited-state absorption.

In multicore amplifiers, both signal and pump radiation need to be launched into the MCF cores efficiently. As discussed above, a plausible solution is to bundle a number of single-mode fibers corresponding to the number of MCF cores into a closely-packed formation and taper the fiber bundle to a diameter where the core-to-core pitch matches that of the multicore gain fiber. Assuming that the input fibers are single-mode fibers having an outer cladding diameter of 125 µm, the fiber bundle has to be tapered by a factor of 3.0 to achieve a core pitch matching that of the multicore fiber.

When an optical fiber is tapered, the percentage change in size of the respective diameter of each fiber region is substantially the same. Thus, when a single-mode fiber undergoes tapering by a factor of 3.0, not only does the outer diameter of the fiber decrease, but the core diameter also decreases by a factor of approximately 3.0. In a standard single-mode fiber, a decrease in core diameter by a factor of 3.0 causes a significant increase in mode field diameter.

FIG. 7 shows a graph 70 illustrating the calculated mode field diameter, at wavelengths of 980 nm (dashed curve 71) and 1550 nm (solid curve 72), as a function of core diameter in a single-mode silica fiber assumed to have a constant index difference delta ($\Delta$) of approximately 0.32%.

In a single-mode fiber, light propagates in the fundamental $LP_{01}$ waveguide mode, which has a Gaussian-shaped transverse energy distribution with a peak at the center of the core region and with a drop-off extending into the cladding. In a SMF, the mode field diameter can be defined as the fiber diameter value at which the transverse energy distribution drops to 1/e of the peak value. As shown in graph 70, at larger core diameters, the mode field diameter is typically less than the core diameter. At smaller core diameters, the mode field diameter is typically greater than the core diameter.

The reason for the sharp increase in MFD at smaller core diameters is that at these smaller diameters, the core-cladding boundary loses its ability to confine all but a relatively small percentage of the propagating light. Thus, at these smaller core diameters, the transverse energy distribution is relatively wide, resulting in a large mode field diameter.

Generally speaking, it is desirable for a fiber to have as small a mode field diameter as possible. Thus, in the present example, the standard single-mode fiber typically has a core radius of approximately 8 μm. As shown in FIG. 7, this core radius corresponds to a minimum or near-minimum MFD at 1550 nm.

When the single-mode fiber of FIG. 7 is tapered from an initial core radius of 8 μm by a factor of 3, the resulting core diameter is approximately 2.67 μm. As shown by curve 72, at that core diameter, the mode field diameter at 1550 nm increases to over 22 μm, and therefore the tapered fiber end cannot be spliced to the relatively small cores of a multicore gain fiber without significant loss.

In a single-core context, the matching of the respective mode field diameters of dissimilar cores (e.g., such as the cores of a single-mode fiber and an erbium-doped fiber) can be accomplished using a thermal diffusion method. Unfortunately, for large changes in mode field diameter, this technique is not suitable for multicore fibers or multicore pedestal fibers. Although some amount of thermal diffusion is typically desirable, in the case of a multicore fiber it may also distort the arrangement of the cores.

An aspect of the invention provides a specially designed pedestal fiber that can be tapered to a smaller diameter with a concurrent change in its mode field diameter. Such a pedestal fiber can be used to address the issue of mode field diameter in constructing a TFB coupler that is suitable for coupling light from multiple fibers to the relatively small cores of a multicore gain fiber.

FIGS. 8A and 8B show respective refractive index profiles 80a and 80b for an exemplary pedestal fiber before tapering (FIG. 8A) and after tapering (FIG. 8B).

Untapered refractive index profile 80a comprises a core region 81a having a first refractive index surrounded by a pedestal region 82a having a second refractive index lower than the first refractive index. The pedestal region 82a is surrounded by a cladding region 83a having a third refractive index lower than the second refractive index.

In the untapered fiber, light is guided by the core 81a with the pedestal acting 82a as a cladding. The propagating mode is confined primarily by the core-pedestal boundary. Because the radius of the pedestal 82a is relatively large compared with the MFD of light guided by core 81a, the pedestal-cladding boundary contributes relatively little to overall mode confinement.

As the fiber is tapered, the core radius decreases, causing a corresponding decrease in the percentage of light confined by the core. At the same time, the size of the pedestal radius approaches that of the core region in the untapered fiber. Thus, in the tapered refractive index profile 80b, the core region 81b is too small to confine more than a small percentage of a propagating mode. Rather, the mode is mainly guided by the boundary between the pedestal 82b and the cladding 83b. Thus, by using a pedestal fiber to construct a TFB coupler, it is possible to use thermal tapering to achieve a desired reduction in core pitch, while also managing the size of the mode field diameter at the tapered end of the fiber.

Figure 9A:
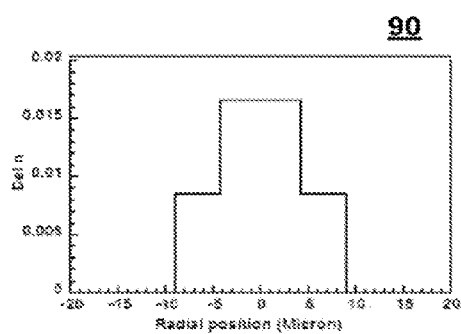
FIG. 9A shows a refractive index profile for an exemplary pedestal fiber according to an aspect of the invention.
Figure 9B:
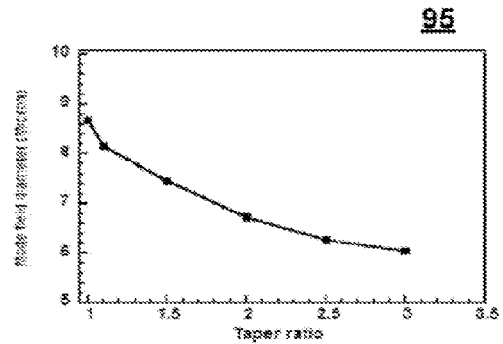
FIG. 9B shows the related(?) calculated mode field diameter for a range of different tapering ratios, in accordance with an embodiment of the present invention.

FIG. 9A shows a refractive index profile for an exemplary pedestal fiber (FIBER-I) according to an aspect of the invention, and FIG. 9B shows the calculated mode field diameter for a range of different tapering ratios. It is shown that for FIBER-I, the mode field diameter steadily decreases as the taper ratio increases:

According to an aspect of the invention, FIBER-I has a pedestal refractive index profile that is configured such that the tapering of the fiber by a selected tapering ratio simultaneously achieves both a desired decrease in core pitch and a desired decrease in mode field diameter.

Thus, as shown in FIG. 9B, it can be seen that as the fiber is tapered by a factor of 3.0, the mode field diameter simultaneously decreases from about 8.5 μm to 6 μm, which is equal to a mode field diameter of an erbium-doped core with a numerical aperture (NA) of 0.23 and a core diameter of 3.2 μm.

Figure 10A:
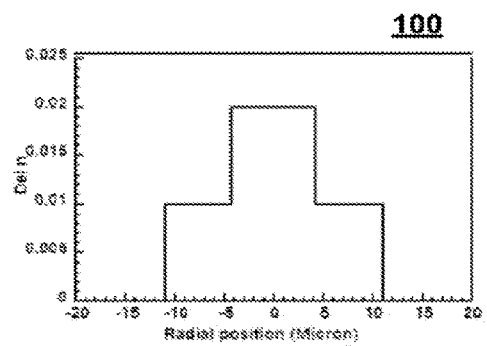
FIG. 10A shows a graph illustrating the refractive index profile of a second pedestal fiber according to an aspect of the invention.
Figure 10B:
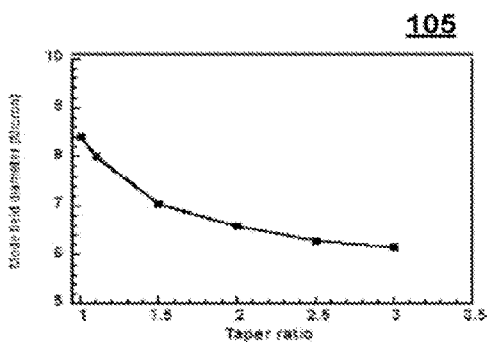
FIG. 10B shows a graph illustrating the related calculated mode field diameter over a range of different tapering ratios, in accordance with an embodiment of the present invention.

FIG. 10A shows a graph 100 illustrating the refractive index profile of a second pedestal fiber (FIBER-II), and FIG. 10B shows a graph 101 illustrating the calculated mode field diameter over a range of different tapering ratios. It will be seen that FIBER-I and FIBER-II have different respective refractive index profiles, but have the same mode field diameter when untapered, and after tapering by a ratio of 3.

According to a further aspect of the invention, a TFB coupler or like device is constructed using a plurality of fibers having the same untapered and tapered mode field diameters, but different refractive index profiles, when tapered by a selected tapering ratio. This technique can be used to suppress crosstalk between neighboring cores.

Figure 11:
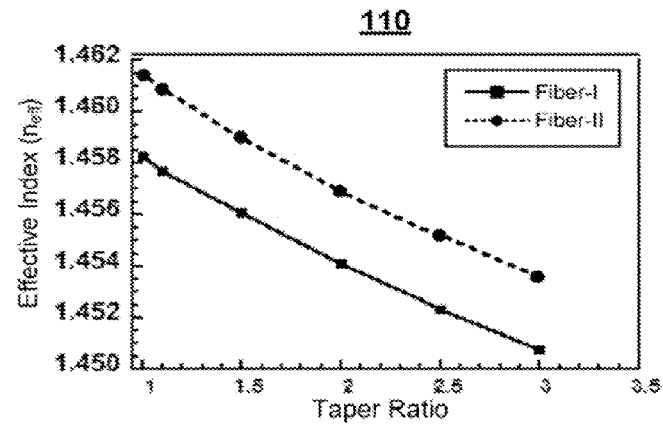
FIG. 11 shows a graph comparing the effective refractive indices for the fibers shown in FIGS. 9A-9B (Fiber-I) and 10A-10B (Fiber-II).

The difference in refractive index profiles results in a difference in effective refractive index between the two fibers. FIG. 11 shows a graph 110 comparing the effective refractive indices for the two fibers as a function of taper ratio. The effective indices calculated for the FIBER-I and FIBER-II differ from each other throughout the tapering range, despite the fact that the MFDs for the two fibers are the same, both before tapering and after tapering by a ratio of 3. Therefore, by first appropriately choosing the values of refractive indices of the core and pedestal, and the respective radii, and second, selecting a specific tapering ratio, it is possible to design a multiple number of fibers exhibiting the same mode field diameter before and after tapering, each fiber having a different effective refractive index, $n_{eff}$. By using such fibers in a TFB coupler, the propagation constants between the fibers are different, inhibiting crosstalk therebetween.

Figure 12:
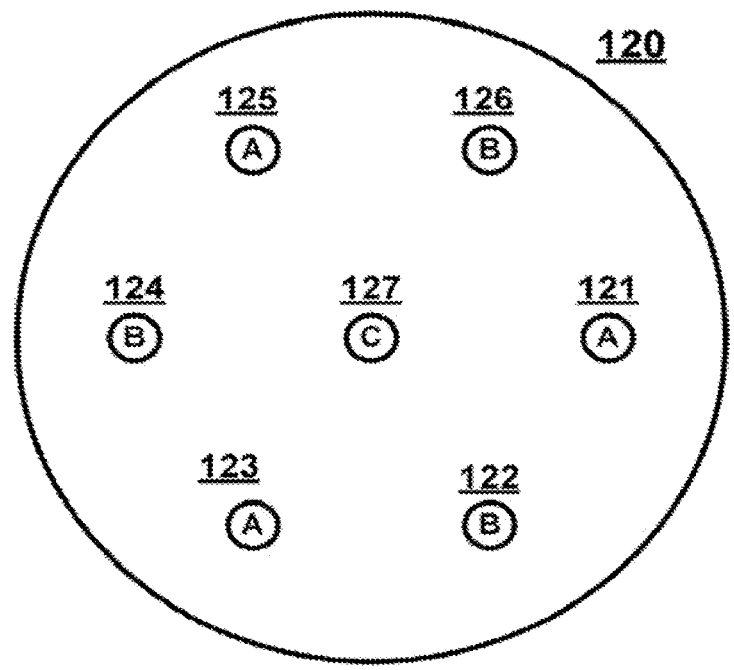
FIG. 12 shows an exemplary configuration of a 7-fiber tapered fiber bundle coupler, in which adjacent cores are configured to have different effective refractive indices, in accordance with an embodiment of the present invention.
Figure 13:
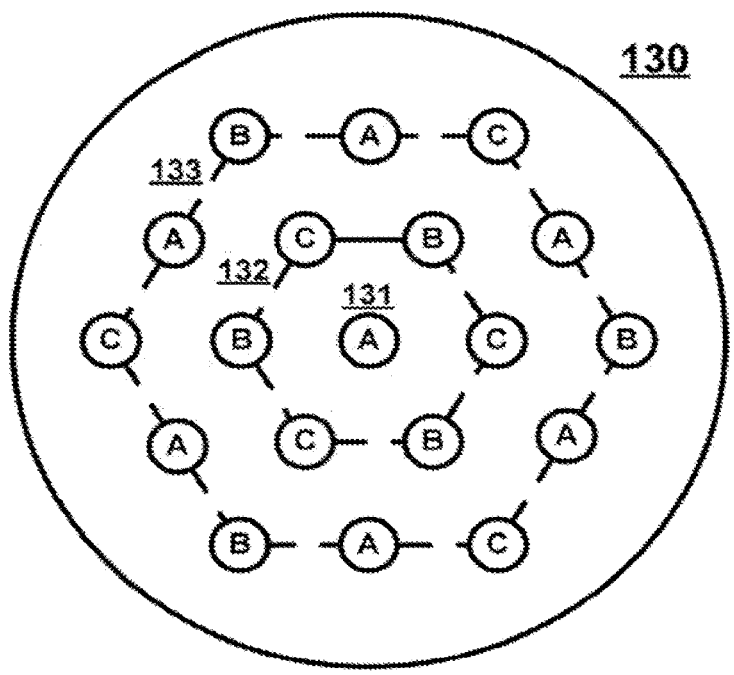
FIG. 13 shows an exemplary configuration of a 19-fiber tapered fiber bundle coupler, in which adjacent cores are configured to have different effective refractive indices, in accordance with an embodiment of the present invention.

In an exemplary 7-core TFB coupler having a hexagonal core configuration, at least three pedestal fibers A, B, and C of the type described above, each having a different effective refractive index, would be required to suppress or minimize crosstalk to an acceptable level before and after tapering. FIG. 12 shows a configuration 120 exemplifying this design. FIG. 13 shows a similar configuration 130 for a 19-core TFB coupler.

It will be seen that in both configurations 120 and 130, a minimum of three different fibers A, B, and C can be used because the cores are arranged in a regular hexagonal array. In the 7-core configuration 120 shown in FIG. 12, outer cores 121-126 are arranged as a regular hexagon with core 127 located at the center of the hexagon. Thus, center core 127 is equidistant from each of the outer cores 121-126, which are themselves equidistant from each other. By using a C-type core as the center core 127, and using alternating A-type and B-type cores as the outer cores 121-126, it will be seen that none of the seven cores 121-127 has an immediately adjacent core of the same type.

It will further be seen that a similar result can be obtained in configuration 130. In that case, an A-type core is used as the center core 131. The first hexagonal ring of cores 132 surrounding core 131 comprises an alternating series of B-type and C-type cores. The second hexagonal ring of cores 133, which surrounds core 131 and first ring 132, comprises an alternating series of core types: A-B-A-C-A-B-A-C-A-B-A-C. Again, none of the 19 cores has an immediately adjacent core of the same type.

It should be noted that in the above description of FIGS. 12 and 13, the assignment of letters A, B, and C is arbitrary, and has no significance other than identifying cores that are identical to, or different from, each other.

Figure 14:
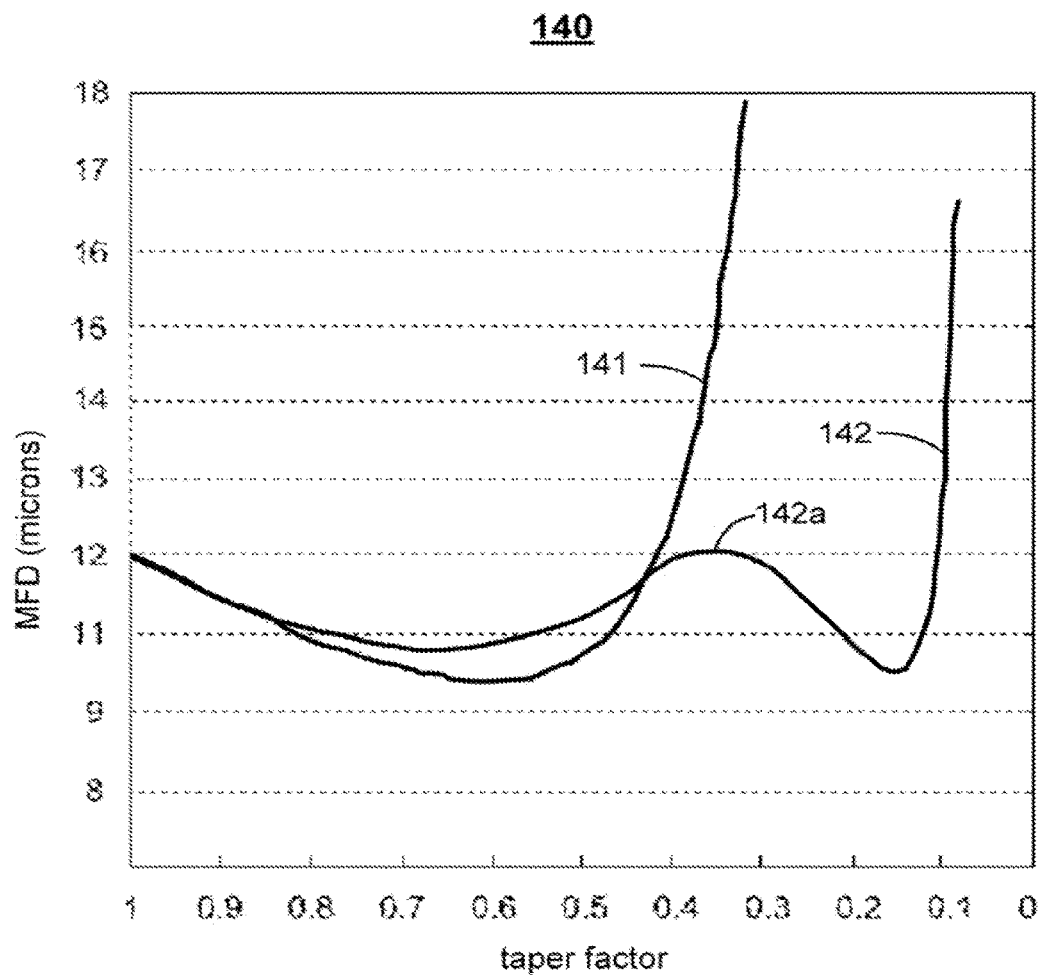
FIG. 14 shows a graph illustrating the relationship between the taper factor and mode field diameter in a standard single-mode fiber and in a pedestal fiber according to an aspect of the invention.

An additional consideration is the evolution of the mode field along the taper. FIG. 14 shows a graph 140 illustrating the relationship between the taper factor and mode field diameter. In FIG. 14, the taper factor is the inverse of the taper ratio of FIG. 11. Curves 141 and 142 illustrate this relationship, respectively, for an exemplary single-mode fiber and an exemplary pedestal fiber.

As shown, the pedestal fiber curve 142 exhibits a more complex MFD evolution than that of the step-index core 141. As show in FIG. 14, the untapered pedestal fiber (taper factor=1.0) has an MFD of approximately 12 μm. For the sake of the present discussion, it is assumed that a given application requires an output MFD of approximately 10 μm. It will be seen in graph 140 that a 10 μm MFD may be achieved by using a taper factor of approximately 0.17 (i.e., a tapering ratio of approximately 6).

However, in graph 140 it will be seen that the pedestal fiber curve 142 has a complex shape that includes a "hump" 142a between the input MFD (taper factor=1.0) and the output MFD (taper factor=0.17). Hump 142a has a peak value of approximately 12 μm at a taper factor of approximately 0.3 (i.e., a tapering ratio of approximately 3.33). In this region of the taper, the pitch of the cores may be sufficiently small (i.e., <~12 μm), such that such large modes (MFD≈12 μm) have sufficient spatial overlap over a sufficient axial extent to cause an undesired level of crosstalk.

In the design of suitable core profiles, care must be taken to avoid such crosstalk within the taper. Generally speaking, crosstalk should be less than −20 dB. It is preferable for crosstalk to be less than −30 dB, or more preferably less than −40 dB for long-distance transport.

4. Other Applications

Similar considerations as described above can be used for other applications and designs. For example the concepts can be extended to increasing, rather than decreasing, the MFD from individual input fibers to multicore output fibers. Also, the mode-converting tapers can be applied to other devices, such as passive optical components, such as isolators, filters, couplers, and the like, as well as active optoelectronic components, such as transmitters, receivers, modulators, and the like.

In these other applications, the modes of the individual fibers can be designed to match the modes of the one or more of the above-listed components while the modes of the multicore fiber can be designed to optimize propagation in the multicore fiber. For multicore components, the opposite arrangement would apply, in which case the individual fibers may be standard single-mode fibers, or fibers optimized for some characteristic.

5. General Techniques

As described above, an aspect of the invention provides a tapered fiber bundle coupler to launch signal and pump radiation into multicore gain fiber such that both the core-to-core pitch and mode field diameter matches with that of multicore gain fiber.

A further aspect of the invention is directed to pedestal fibers having refractive index profiles that are specially designed for such applications. The described fibers can be conveniently tapered by a factor as large as ~3.33, while simultaneously adjusting the MFD to match that of a pigtail fiber (MFD≈8-9 μm) and an erbium-doped core (MFD≈6 μm).

Another aspect of the invention is directed to pedestal fibers having similar tapering and MFD characteristics, but different propagation constants. These fibers are used to form a tapered fiber bundled coupler. The fibers are arranged in a way such that fibers with identical propagation constants are not located next to each other, so as to suppress crosstalk therebetween, such as the designs shown in FIGS. 12 and 13.

Figure 15:
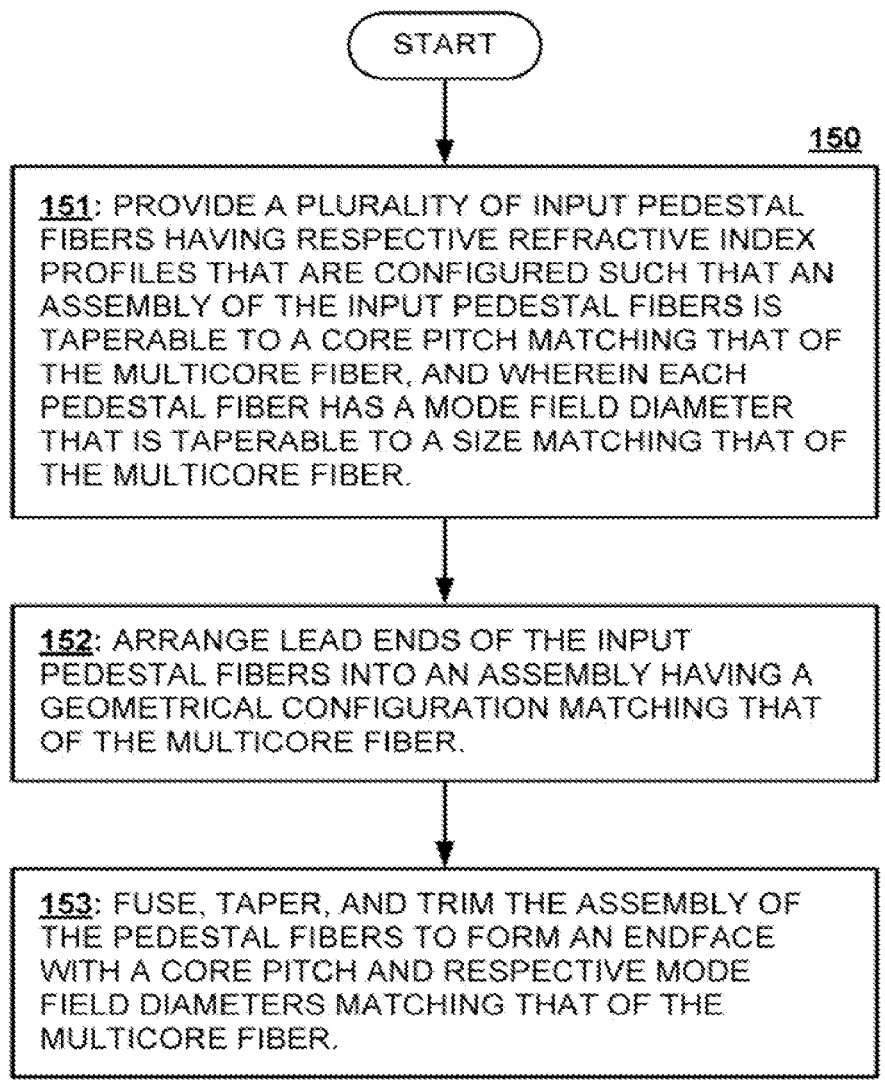
FIG. 15 shows a flowchart of a general technique according to an aspect of the present invention for coupling a plurality of input fibers to individual cores of a multicore fiber.

FIG. 15 shows a flowchart of an exemplary general technique 150 according to an aspect of the present invention for coupling a plurality of input fibers to a multicore fiber, comprising.

Technique 150 comprises the following steps:

151: Provide a plurality of input pedestal fibers having respective refractive index profiles that are configured such that an assembly of the input pedestal fibers is taperable to a core pitch matching that of the multicore fiber, and wherein each pedestal fiber has a mode field diameter that is taperable to a size matching that of the multicore fiber.

152: Arrange lead ends of the input pedestal fibers into an assembly having a geometrical configuration matching that of the multicore fiber.

153: Fuse, taper, and trim the assembly of the pedestal fibers to form an endface with a core pitch and respective mode field diameters matching that of the multicore fiber.

As discussed above, according to a further practice of the invention, the fibers in the TFB coupler are configured to have different effective refractive indices, so as to suppress crosstalk therebetween.

6. Example of Experimental Use of TFB Coupler

The TFB coupler described herein has been used in studying the amplification and noise properties of a 7-core multicore erbium-doped fiber (MC-EDF) amplifier providing simultaneous amplification in all seven cores. The pump and signal radiation were coupled to individual cores of MC-EDF using two of the described TFB couplers.

The results of this work are set forth in K. S. Abedin et al., "Amplification and Noise Properties of an Erbium-Doped Multicore Fiber Amplifier," Optics Express, Vol. 19, Issue 17, pp. 16715-16721 (2011), which was reproduced in its entirety as part of the provisional patent application from which the present application claims priority, and which is incorporated herein by reference in its entirety.

The 7-core MC-EDF was made from commercially available erbium-doped core rods. The cores were arranged in a hexagonal array with a 40.9 μm pitch. The core diameter and numerical aperture are equal to 3.2 μm and 0.23, respectively. The fiber had a cladding diameter of 148 μm and an acrylate coating with a diameter of 250 μm. The mock field diameter at 1550 nm was estimated to be about 6 μm. The absorption loss of the erbium-doped core at 1550 nm was ~2.3 dB/m.

The TFBs were fabricated by bundling 7 specially designed fibers to achieve a core-to-core pitch at the tapered end matching the MC-EDF, and tapering the bundle by a taper ratio of approximately 3. This allowed for use of a conventional PM fusion splicer. In the TFBs, in order to provide an interface between an MCF and single-mode fibers, the mode field diameter was kept constant before and after tapering. Since high-performance EDF has a smaller MFD, the TFBs were designed to allow adiabatic conversion of mode field diameter from 9.04 to 6.1 μm. The 7 input fibers at the untapered end of TFBs had a MFD ($LP_{01}$) of 9.04 μm and could be spliced to SMF fibers with minimal loss.

Figure 16:
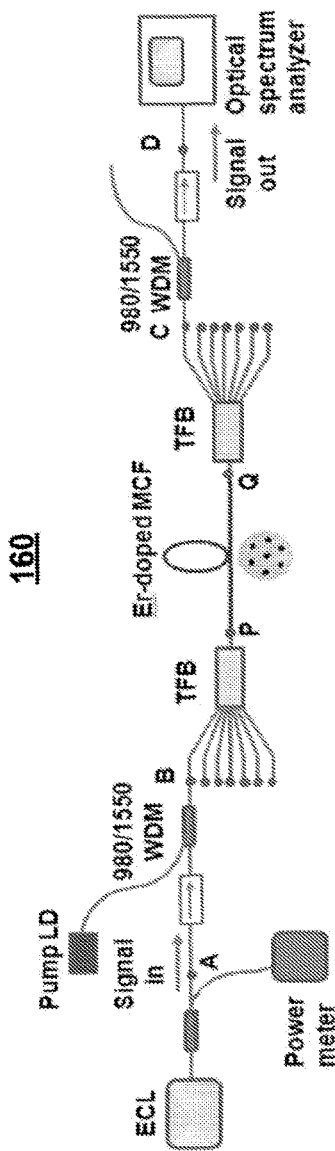
FIG. 16 shows a diagram of an experimental setup employing tapered fiber bundle couplers, according to an aspect of the invention.

FIG. 16 shows a diagram of an experimental setup 160 that was used to study the amplification properties of the EDFA. Single-frequency laser radiation from an external cavity laser diode operating in the range of 1520-1580 nm was used as a signal, which was combined with pump radiation at 980 nm using WDM couplers. In order to avoid spurious back-reflection and suppress ASE noise, isolators were connected at both the input and output ports, and pump radiation was allowed to propagate in the forward direction. For measurement purposes the central core was numbered as #0 and the outer cores were numbered from #1 to #6, in sequence.

Power of the amplified output and amplified spontaneous emission (ASE) noise under different input wavelengths and power levels were measured using an optical spectrum analyzer. Passive loss in the isolators and the WDM were measured over a range of 1520-1580 nm, while the loss between the input and output ports of TFB-MCF-TFB assembly was measured at 1300 nm, where erbium has low absorption loss. The signal and noise power level at all other locations in the amplifier could thus be easily estimated.

Figure 17:
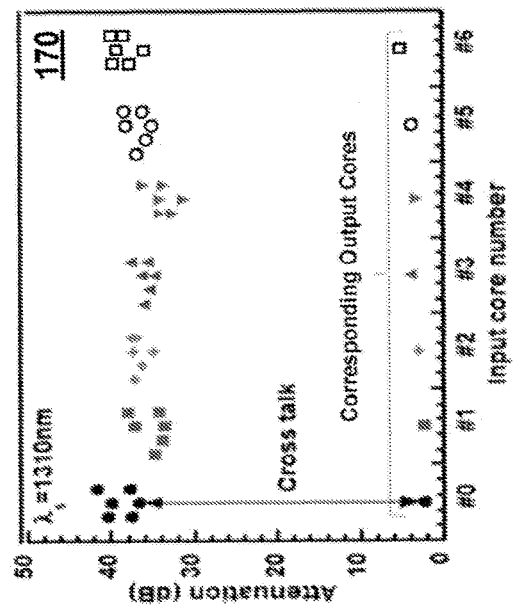
FIG. 17 shows a graph illustrating loss and crosstalk properties of the tapered fiber bundle couplers used in the experimental setup shown in FIG. 16, in accordance with an embodiment of the present invention.

FIG. 17 shows a graph 170 illustrating the loss and cross-talk properties in the TFB-MCEDF-TFB module measured at 1310 nm. The numbers in the horizontal axis represents the core in which light was launched, and the vertical axis shows the attenuation in the signal, measured at seven outputs of the second TFB. Thus attenuation between the corresponding cores represents the insertion loss. The difference (in dB) in attenuations between corresponding and different cores can be considered as a measure of cross-talk. The loss between an input and corresponding output core of the gain assembly remained within 2.5-4.9 dB. The crosstalk averaged over six cores varied between 30.2 and 36.6 dB for the seven channels. A similar measurement was performed at the signal wavelength of 1546 nm (input power: 0.36 dBm), yielding an average absorption of 33.7 dB in the 15 in long MC-EDF.

The low-loss coupling of TFB couplers, allowed a net gain of approximately 25 dB (gross gain ~30 dB) to be obtained, with a noise figure smaller than 4 dB and 3-dB saturated output of over 10 dBm. The ASE level from the neighboring channel was below 25 dB.

CONCLUSION

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. An optical fiber coupler for providing an interface between a plurality of input fibers and a plurality of individual cores of a multicore fiber, wherein the input fibers and the multicore fiber have respective outer diameters that are equal in size, comprising:
   a plurality of coupler fibers, each having a respective input core, that are bundled together at one end, fused, and tapered to form a tapered fiber bundle (TFB) having a multicore output endface, wherein each coupler fiber has an untapered end forming a respective TFB input and a tapered end terminating at the multicore output endface,
   wherein the plurality of coupler fibers and the multicore output endface have respective outer diameters that are equal in size to each other and to the respective outer diameters of the input fibers and the multicore fiber for which an interface is being provided,
   wherein each of the plurality of TFB inputs has a respective geometry and mode field diameter configured for a low-loss connection to a respective input fiber,
   wherein each of the plurality of coupler fibers has a respective pedestal refractive index profile that is configured such that the tapering of the plurality of coupler fibers to a predetermined taper ratio results in a multicore TFB output endface having a geometry and individual cores with respective mode field diameters that are configured for low-loss connection to respective cores of a multicore fiber, and
   wherein each of the plurality of coupler fibers has a respective pedestal refractive index profile that is configured such that, throughout each coupler fiber's untapered and tapered ends, each of the input cores has a respective mode field diameter that is equal to that of the other input cores, and each of the input cores has a respective effective index that is different from that of neighboring input cores, and
   wherein the TFB has a core-to-core pitch that avoids spatial overlap between neighboring mode fields,
   such that crosstalk between neighboring cores is suppressed at each position within the TFB.

2. The optical fiber coupler of claim 1, wherein each of the plurality of coupler fibers comprises:
   a central core region having a first refractive index, a pedestal region surrounding the core region and having a second refractive index lower than the first refractive index, and a cladding region surrounding the pedestal region and having a third refractive index lower than the second refractive index,
   wherein the core region, pedestal region, and cladding region are configured such that the fiber is taperable to form a tapered fiber having an untapered outer cladding diameter at a first end and a tapered outer cladding diameter at a second end, and
   wherein the tapered fiber has a first mode field diameter at the untapered end and a second, different mode field diameter at the tapered end, wherein the second mode field diameter differs from the first mode field diameter in correspondence with the difference between the tapered outer cladding diameter and the untapered outer cladding diameter.

3. The optical fiber coupler of claim 2,
   wherein for each of the plurality of coupler fibers the tapered outer cladding diameter is smaller than the untapered outer cladding diameter.

4. The optical fiber coupler of claim 3,
   wherein the first mode field diameter corresponds to a mode field diameter of a pigtail optical fiber, and wherein the second mode field diameter corresponds to a mode field diameter of a core of an optical gain fiber.

5. The optical fiber coupler of claim 4,
   wherein the second mode field diameter corresponds to a mode field diameter of a selected individual core of a multicore optical gain fiber.

6. The optical fiber coupler of claim 2,
   wherein the tapered outer cladding diameter is larger than the untapered outer cladding diameter, and the second mode field diameter is larger than the first mode field diameter, so that the tapered fiber can be utilized to increase mode field diameter from individual input fibers to multicore output fibers.

7. The optical fiber coupler of claim 1,
   wherein the tapered fiber bundle coupler is adapted for use in launching signal and pump radiation from individual fibers into a multicore gain fiber such that the core to core pitch and respective mode field diameters of the individual fibers is converted to respective core-to-core pitch and mode field diameters of respective cores of the multicore gain fiber.

8. The optical fiber coupler of claim 1,
wherein the optical fiber coupler is adapted for connection to passive optical components.

9. The optical fiber coupler of claim 8,
wherein the passive optical components include any of isolators, filters, and couplers.

10. The optical fiber coupler of claim 1,
wherein the tapered fiber bundle coupler is adapted for connection to active optical components.

11. The optical fiber coupler of claim 1,
including one or more active optical components,
wherein the one or more active optical components include any of transmitters, receivers, modulators.

12. The optical fiber coupler of claim 11,
wherein the plurality of coupler fibers is configured to have modes matching modes of respective component cores to which individual fibers are coupled.

13. The optical fiber coupler of claim 12,
wherein modes of a multicore fiber section of a tapered fiber bundle coupler optimize propagation in a multicore fiber connected to the coupler.

* * * * *